(12) United States Patent
Mizutani

(10) Patent No.: US 7,632,558 B2
(45) Date of Patent: Dec. 15, 2009

(54) HONEYCOMB STRUCTURE

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/172,822

(22) Filed: Jul. 14, 2008

(65) Prior Publication Data
US 2008/0274324 A1 Nov. 6, 2008

Related U.S. Application Data

(63) Continuation of application No. PCT/JP2007/050717, filed on Jan. 18, 2007.

(30) Foreign Application Priority Data

Jan. 18, 2006 (JP) .............................. 2006-009502

(51) Int. Cl.
B32B 3/12 (2006.01)
(52) U.S. Cl. ...................................... 428/116; 428/117
(58) Field of Classification Search ........................ None
See application file for complete search history.

(56) References Cited

U.S. PATENT DOCUMENTS 5,188,779 A * 2/1993 Horikawa et al. ........... 264/630
2004/0045267 A1 * 3/2004 Ichikawa et al. ............. 55/523
2005/0180898 A1 8/2005 Yamada
2007/0059483 A1 3/2007 Fujita et al.

FOREIGN PATENT DOCUMENTS

| JP | U-02-117033 | 9/1990 |
| JP | A-2001-170426 | 6/2001 |
| JP | A-2004-262669 | 9/2004 |
| WO | WO 03/084640 A1 | 10/2003 |

* cited by examiner

Primary Examiner—Timothy M Speer
Assistant Examiner—Gordon R Baldwin
(74) Attorney, Agent, or Firm—Oliff & Berridge, PLC

(57) ABSTRACT

There is provided a honeycomb structure which is useful as a trapping filter for exhaust gas, especially as a DPF for a diesel engine and capable of effectively inhibiting defects such as a crack due to thermal stress from being generated upon use and regeneration. The honeycomb structure is provided with a honeycomb segment bonded body obtained by unitarily bonding a plurality of honeycomb segments at bonded faces via a bonding material layer and the outer periphery coat layer and has a structure having a plurality of cells functioning as fluid passages disposed in parallel with one another in a direction of a central axis. The honeycomb structure is characterized in that a bonding cross portion where two or more bonding material layers cross has a smaller thermal capacity than those of bonding portions other than the bonding cross portion.

9 Claims, 4 Drawing Sheets

HONEYCOMB STRUCTURE

TECHNICAL FIELD

The present invention relates to a honeycomb structure having a structure where a plurality of honeycomb segments are unitarily bonded with bonding material layers.

BACKGROUND ART

A honeycomb structure is frequently used as a trapping filter for exhaust gas for environmental improvements, pollution control, and the like. Above all, there are large expectations on a honeycomb structure used in a state of being incorporated into an exhaust gas system or the like of a diesel engine as a diesel particulate filter (DPF) in order to trap and remove particulate matter contained in exhaust gas from a diesel engine or the like. As a material for the honeycomb structure, silicon carbide (SiC) is being spotlighted and used in view of having a merit of excellent thermal resistance.

However, the honeycomb structure used as a DPF has a problem of easily generating defects such as a crack due to thermal stress because temperature rise is prone to be uneven when particulate matter is trapped and removed (upon use) and when particulate matter accumulating inside the filter is combusted and removed in order to remove increase in pressure loss by particulate matter accumulating with time in the filter. In addition, since a silicon carbide honeycomb structure also has a demerit of inferiority in thermal shock resistance because of high thermal expansion coefficient to a cordierite honeycomb structure, the silicon carbide honeycomb structure has a problem of difficulty in sufficiently taking advantage of the aforementioned merit. Further, according to remarkable increase in thermal stress generated upon use and upon regeneration with respect to a conventional honeycomb filter as the filter (DPF) grows in size, the frequency and extent of generation of defects due to thermal stress are becoming more serious.

Therefore, from the viewpoint of solving these problems, there has been proposed a honeycomb structure having a structure where a plurality of honeycomb segments are unitarily bonded at bonded faces via a bonding material layer. In such a honeycomb structure, the bonding material layer functions as a cushioning material for suppressing thermal expansion and eases up thermal stress. In addition, by employing a segment structure, a distance between a portion having high temperature and a portion having low temperature is reduced, and temperature gradient is reduced. Therefore, a honeycomb structure constituted as a honeycomb segment bonded body has an excellent property of hardly causing defects such as a crack. Incidentally, as a prior art document regarding a honeycomb structure constituted as a honeycomb segment bonded body, there is, for example, Patent Document 1.

Patent Document 1: JU-A-H2-117033

DISCLOSURE OF THE INVENTION

However, a honeycomb structure constituted as a conventional honeycomb segment bonded body is not always capable of sufficiently inhibiting defects from being caused due to thermal stress though it has an adamant bonding structure. The present invention has been made in view of such current conditions and aims to provide a honeycomb structure which is useful as a trapping filter for exhaust gas, especially as a DPF for trapping particulate matter and the like in exhaust gas from a diesel engine and which is capable of effectively inhibiting defects such as a crack due to thermal stress from being generated upon use and regeneration.

As a result of repeated investigation on this problem, it has been found out that a crack is prone to generate in a portion where bonding material layers intersect of the honeycomb structure. In addition, as a result of further research, it has been understood that, though the bonding material layer absorbs stress in a portion brought into contact with a side face of each honeycomb segment and plays a role of reducing temperature gradient when the internal temperature of the DPF rises upon regeneration, a function of reducing stress is not required in the portion brought into contact with a corner of each honeycomb segment, i.e., a portion where bonding material layers intersect because a quadrangular honeycomb segment expands roundly and that temperature hardly rises in the portion because of high thermal capacity. Therefore, it is presumed that, by the above reason, corner portions of each honeycomb segment near the portion where bonding material layers intersect has lowest temperature in each honeycomb segment, thereby generating thermal stress due to a temperature difference from points having high temperature to cause a crack generation; and the presumption led to creation of a technical means for solving the problem. Specifically, in order to achieve the above aim, according to the present invention, there is provided the following honeycomb structure.

That is, according to the present invention, there is provided a honeycomb structure comprising a honeycomb segment bonded body obtained by unitarily bonding a plurality of honeycomb segments at bonded faces via a bonding material layer and an outer periphery coat layer coating an outer peripheral face of the honeycomb segment bonded body and having a structure having a plurality of cells functioning as fluid passages disposed in parallel with one another in a direction of a central axis, wherein a bonding cross portion where two or more bonding material layers of the bonding material layers cross has a smaller thermal capacity than those of bonding portions other than the bonding cross portion of the bonding material layers.

In the present specification, a structure where a plurality of honeycomb segments are unitarily bonded at bonded faces via a bonding material layer is called a segment structure, and the whole of a plurality of honeycomb segments unitarily bonded with one another is called a honeycomb segment bonded body.

In a honeycomb structure of the present invention, it is preferable that the bonding cross portion has a thermal capacity of 5% or more and 95% or less with respect to 100% of thermal capacities of bonding portions other than the bonding cross portion. It is more preferable that the bonding cross portion has a thermal capacity of 10% or more and 90% or less with respect to thermal capacities of bonding portions other than the bonding cross portion.

In addition, in a honeycomb structure of the present invention, the bonding cross portion preferably has a higher porosity than those of bonding portions other than the bonding cross portion.

In a honeycomb structure of the present invention, it is preferable that the bonding cross portion has a porosity 1.1 to 15 times larger than those of bonding portions other than the bonding cross portion. It is more preferable that the bonding cross portion has a porosity 2 to 10 times larger than those of bonding portions other than the bonding cross portion.

In the present specification, a porosity means a proportion of pores to a volume each of the bonding cross portion or the bonding portion other than the bonding cross portion. The porosity is obtained by observing ten cross sections with respect to the axial direction. Specifically, in each cross section, a bonding portion is cut out, and resin is stuffed therein, followed by grinding to observe the cross section with SEM (electronic microscope). By digitalizing the image obtained by the SEM by image analysis to calculate the porosity of each image (each cross section). The average value of data of 10 cross sections is determined as the porosity of the structure.

In a honeycomb structure of the present invention, it is preferable that the bonding material layer is constituted of inorganic fibers, an inorganic binder, an organic binder, and inorganic particles.

It is also preferable that the honeycomb segment is constituted of silicon carbide or a silicon-silicon carbide based composite material formed with employing silicon carbide as a framework and silicon as a bonding material.

Since a honeycomb structure of the present invention preferably has many pores in a bonding cross section and a smaller thermal capacity than that of the bonding portion other than bonding cross portions, temperature of corner portion of a honeycomb segment adjacent to the bonding cross section is prone to rise relatively, and a temperature gradient as the whole honeycomb segment bonded body is small. Therefore, defects such as a crack due to thermal stress upon use and upon regeneration can effectively be inhibited from generating.

DESCRIPTION OF REFERENCE NUMERALS

Figure 1:
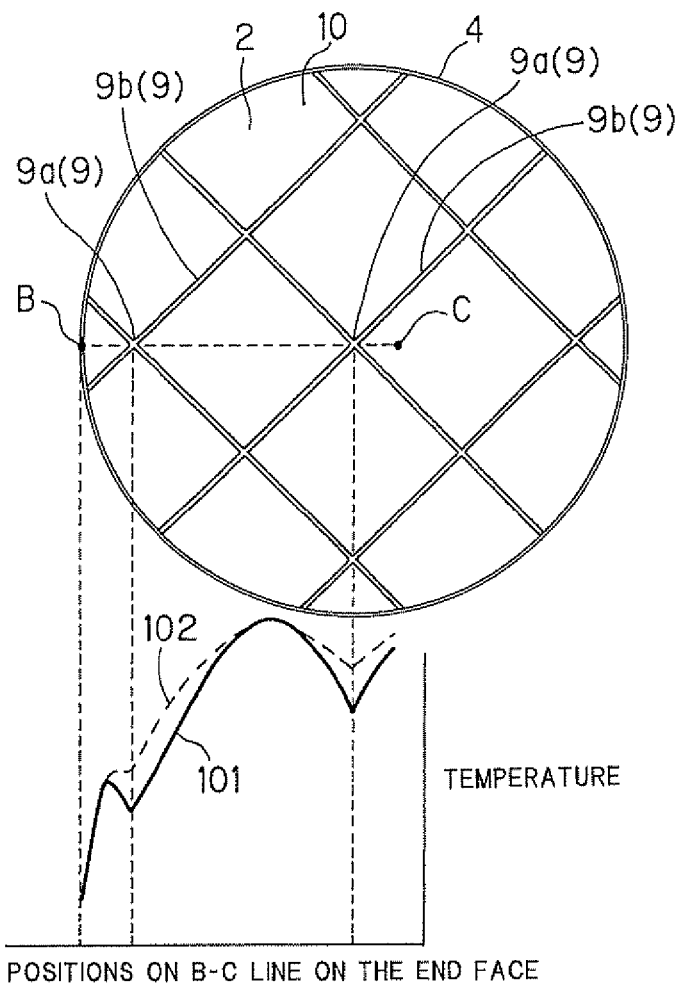
FIG. 1 is an explanatory view showing an appearance of a temperature gradient in a honeycomb structure.

2 Honeycomb segment
4 Outer periphery coat layer
5 Cell
6 Partition wall
7 Filler
9 Bonding material layer
9a Bonding cross portion
9b Bonding portion other than bonding cross portions
10 Honeycomb segment bonded body
40, 50 Honeycomb structure

BEST MODE FOR CARRYING OUT THE INVENTION

Hereinbelow, embodiments regarding the present invention will be described with suitably referring to the drawings. However, the present invention should not be construed with limiting to these. Various kinds of changes, modifications, improvements, and substitutions maybe added thereto on the basis of a person of ordinary skill within a range of not spoiling the gist of the present invention. For example, the drawings show preferable embodiments of the present invention. However, the present invention is not restricted by embodiments shown by the drawings or information shown by the drawings. Upon carrying out or examining the present invention, means similar or equivalent to that described in the present specification are applicable. However, a preferable means is the means described below.

Figure 4:
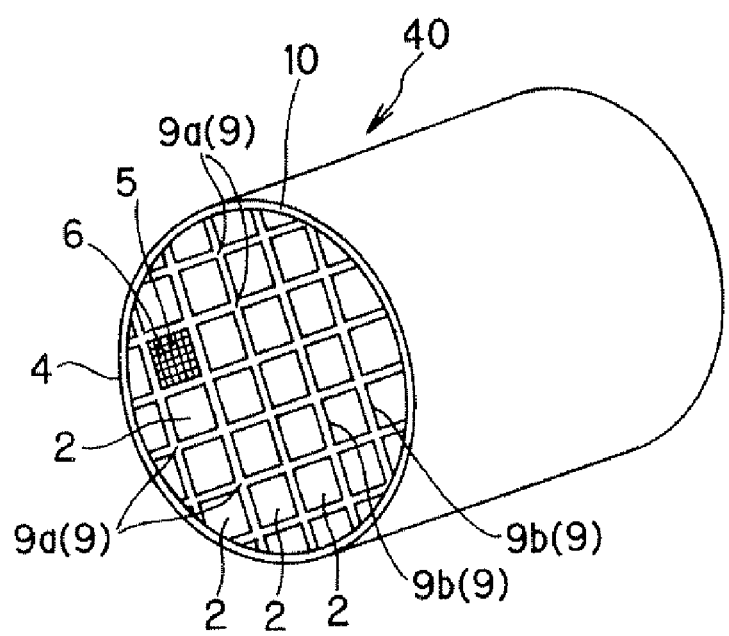
FIG. 4 is a perspective view schematically showing an embodiment of a honeycomb structure of the present invention.
Figure 5:
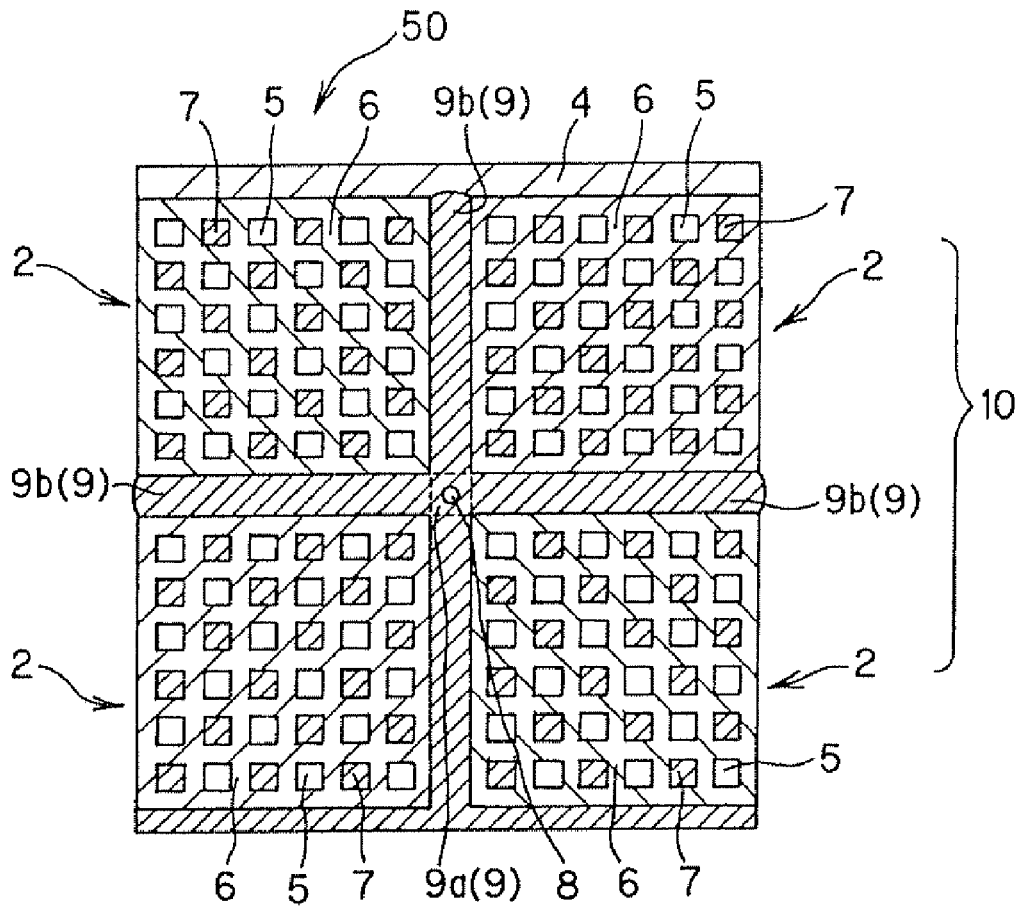
FIG. 5 is a front view from an end face side of a part of another embodiment of a honeycomb structure of the present invention.
Figure 6:
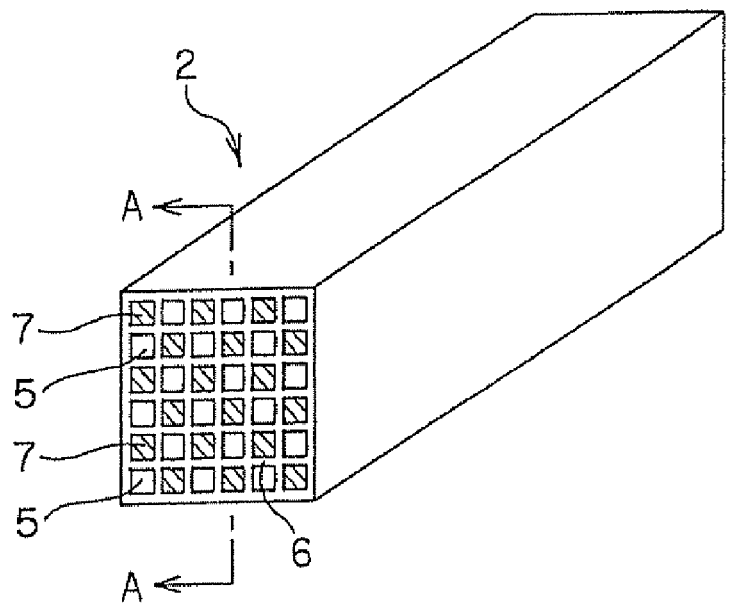
FIG. 6 is a perspective view schematically showing a honeycomb segment used for another embodiment of a honeycomb structure of the present invention.
Figure 7:
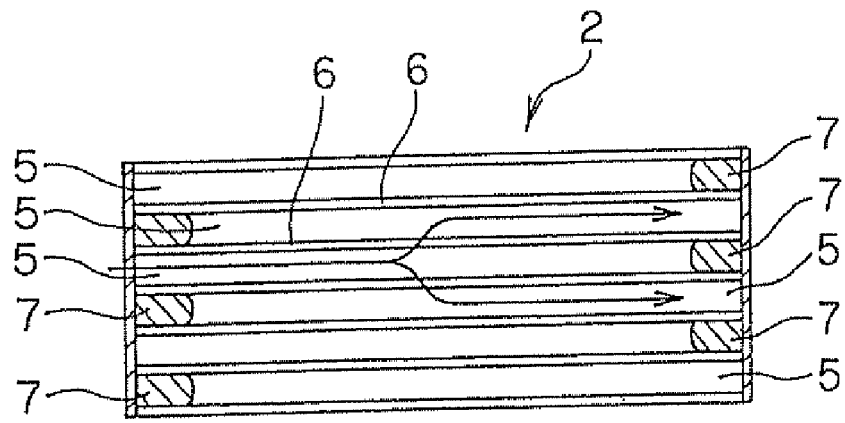
FIG. 7 is an A-A line cross-sectional view in FIG. 6.

FIG. 4 is a perspective view schematically showing an embodiment of a honeycomb structure of the present invention. In the honeycomb structure 40 shown in FIG. 4, the whole outer shape is columnar (or cylindrical), and a cross-sectional shape taken along a plane perpendicular to the central axis is circular. In FIG. 4, cells 5 and partition walls 6 are shown only in one honeycomb segment 2. In addition, FIG. 5 is a front view from an end face side of a part of another embodiment of a honeycomb structure of the present invention. In a honeycomb structure 50 shown in FIG. 5, the whole outer shape (not illustrated) is columnar (or polygonal cylindrical), and a cross-sectional shape taken along a plane perpendicular to the central axis is square. Further, FIG. 6 is a perspective view schematically showing a honeycomb segment used for a honeycomb structure of the present invention. FIG. 7 is an A-A line cross-sectional view in a honeycomb segment 2 shown in FIG. 6.

The honeycomb structure 40 and the honeycomb structure 50 have the same constitution except for the whole outer shape (shape of the outer peripheral coat layer). That is, as shown in FIGS. 4 to 7, both the honeycomb structure 40 and the honeycomb structure 50 in embodiments of the present invention are provided with a honeycomb segment bonded body 10 having a plurality of honeycomb segments 2 unitarily bonded with one another at bonding faces thereof via a bonding material layer 9 and an outer peripheral coat layer 4 covering the outer peripheral face of the honeycomb segment bonded body 10 and have a structure where a plurality of cells 5 functioning as fluid passages are disposed in parallel with one another in the direction of the central axis.

The honeycomb structures 40, 50 have a structure where a plurality of cells 5 separated and formed by porous partition walls 6 and functioning as fluid passages are disposed in parallel with one another in the direction of the central axis (of each honeycomb structure) In addition, the honeycomb structures 40, 50 is constituted as a structure provided with a honeycomb segment bonded body 10 having a plurality of honeycomb segments 2 unitarily bonded with a bonding material layer 9 and an outer peripheral coat layer 4 covering the outer peripheral face of the honeycomb segment bonded body 10. Each of the honeycomb segments 2 has a shape for constituting a part of the whole structure of the honeycomb structures 40, 50, and the honeycomb segments 2 constitutes the whole structure by being joined in the direction perpendicular to the central axis (of the honeycomb structure).

Incidentally, a honeycomb structure of the present invention is not limited to a honeycomb structure having a circular or square cross-sectional shape taken along a plane perpendicular to the axial direction as the honeycomb structures 40, 50. A honeycomb structure of the present invention can be obtained by grinding a bonded honeycomb segment bonded body bonded with a bonding material layer in such a manner that the whole cross-sectional shape taken along a plane perpendicular to the axial direction (of the honeycomb structure) may have an ellipse, a racetrack or a partially transformed shape thereof, followed by covering the outer peripheral face with an outer peripheral coat layer. In addition, the honeycomb segments may have a cross-sectional shape of a rectangle, a partially transformed rectangle, a triangle, a hexagon, or the like. Further, the cells may have a cross-sectional shape of a polygon, a circle, an ellipse, a racetrack, or a partially transformed shape thereof.

When the honeycomb structures 40, 50 are used for a diesel particulate filter, particulate matter containing soot discharged from a diesel engine can be trapped by disposing the honeycomb structure in an exhaust gas system or the like of the diesel engine. As shown in FIGS. 6 and 7, the cells 5 are disposed in parallel with one another in a direction of the central axis of the honeycomb structures 40, 50, and each end portion in the adjacent cells 5 is alternately plugged with a filler 7. Predetermined cells 5 (inflow cells) are open on the left end portion side in the FIGS. 6 and 7 and plugged with the filler 7 on the right end portion side, and the other cells 5 (outflow cells) adjacent to the predetermined cells 5 are plugged with the filler 7 on the left end portion side and open on the right end portion side. By such plugging, as shown in FIG. 5, each end face of the honeycomb segments 2 shows a checkerwise pattern.

When the honeycomb structure 40 or 50 having a plurality of honeycomb segments 2 bonded together is disposed in an exhaust gas system, exhaust gas flows in the cells 5 of each honeycomb segment 2 from the left side in FIG. 7 and moves to the right side. FIG. 7 shows the case that the left side of the honeycomb segment 2 serves as the inlet of exhaust gas, and the exhaust gas flows into the honeycomb segments 2 from the cells 5 (inflow cells) open without being plugged. The exhaust gas flowing in the cells 5 (inflow cells) passes through the porous partition walls 6 and flows out from the other cells 5 (outflow cells). When the exhaust gas passes through the partition walls 6, particulate matter containing soot in the exhaust gas is trapped by the partition walls 6. Thus, exhaust gas can be purified. Since particulate matter containing soot accumulates over time inside the honeycomb segments 2 by the trapping to increase pressure loss, regeneration by combusting soot and the like are conducted.

A honeycomb structure of the present invention has the aforementioned structure. Further, a pore 8 is formed in a bonding cross portion 9a where two bonding material layers 9 cross (see the honeycomb structure 50 shown in FIG. 5, and omitted in FIG. 4), and thereby the bonding cross portion 9a has a higher porosity than those of bonding portions other than the bonding cross portion 9b, which is of a bonding material layer 9 other than the bonding cross portion 9a. Further, this makes a thermal capacity of the bonding cross portion 9a smaller than those of bonding portions other than the bonding cross portion 9b. In a preferable embodiment of the present invention, the bonding cross portion has a thermal capacity of 5% or more and 95% or less with respect to 100% of thermal capacities of bonding portions other than the bonding cross portion.

As a means to make a difference in thermal capacity depending on a place of the bonding material layer 9 besides a means where a porosity is adjusted by the formation of the pore 8, it can be employed a means where a material used for the bonding material layer 9 is varied depending on places, and the present invention do not exclude the means. However, it is preferable to make a difference in thermal capacity by allowing the bonding cross portion 9a to have a higher porosity than those of bonding portions other than the bonding cross portion 9b. In a preferable embodiment of the present invention, the bonding cross portion 9a has a porosity 1.1 to 15 times larger than those of bonding portions other than the bonding cross portion 9b.

Figure 2:
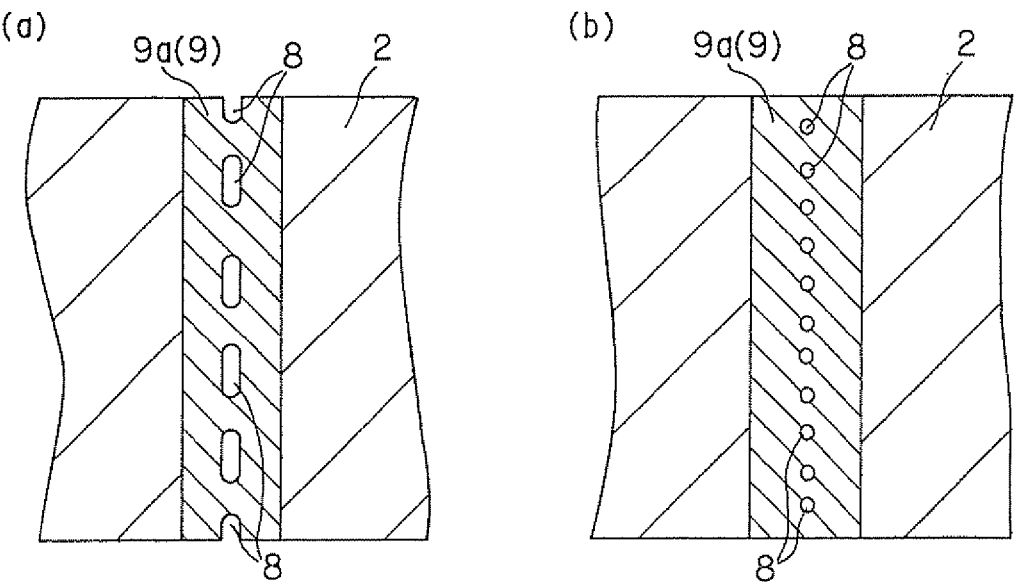
FIGS. 2(a) and 2(b) are cross-sectional views including a bonding cross section in an embodiment of a honeycomb structure of the present invention.
Figure 3:
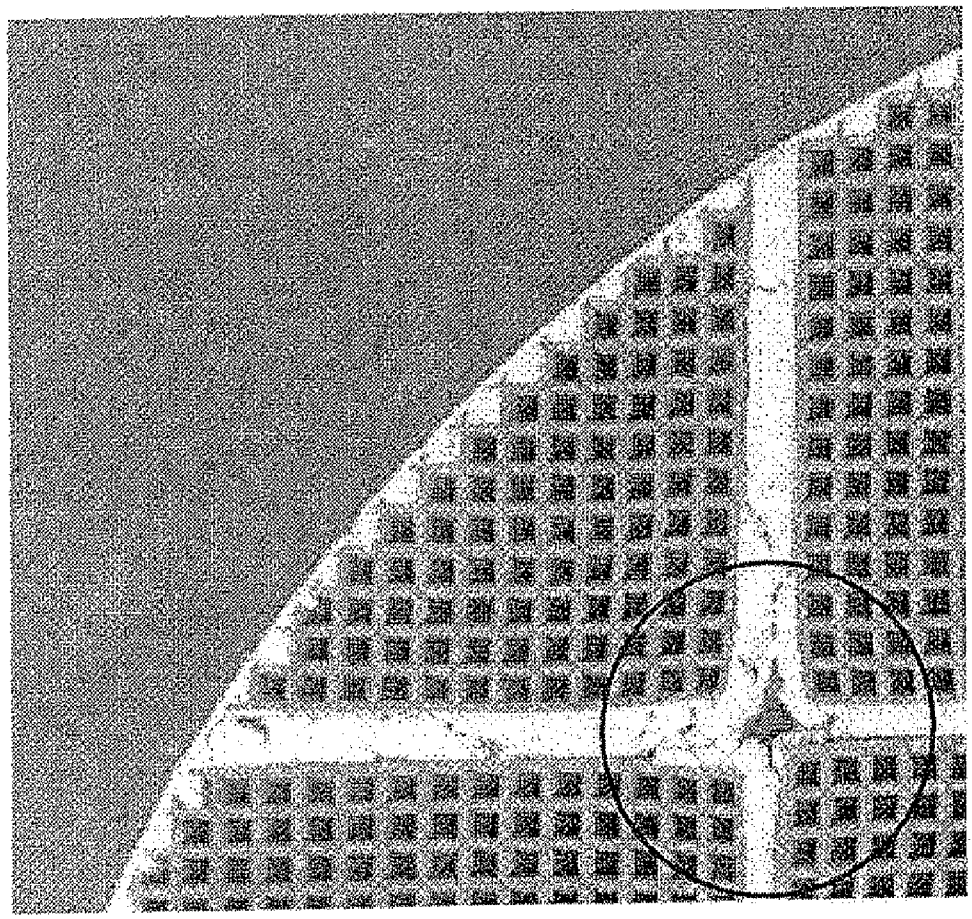
FIG. 3 is a photograph instead of a drawing taken from an end face side of a part of a honeycomb structure of the present invention.

FIGS. 2 and 3 are views showing an example of an embodiment of a pore. FIG. 3 is a photograph taken from an end face side of a part of an actually manufactured honeycomb structure of the present invention. FIGS. 2(*a*) and 2(*b*) are views showing a cross section (cross section in the same direction as in FIG. 7) in a direction of the central axis including a bonding cross portion in an embodiment of a honeycomb structure of the present invention. From FIG. 3, it can be understood that a pore is shown in a portion surrounded by a circle indicating a vicinity of the bonding cross portion. In addition, since the pore 8 formed in the bonding cross portion 9a as shown in FIGS. 2(*a*) and 2(*b*) is for adjusting a porosity (for increasing a porosity with respect to the bonding portion other than the bonding cross portion), the pore 8 may be exposed on an end face of the honeycomb structure (see FIG. 2(*a*)) as in the cases of FIGS. 3 and 5 or may be not exposed on an end face of the honeycomb structure (see FIG. 2 (*b*)). However, the pore is not communicated from one end face side to the other end face side of the honeycomb structure because the honeycomb structure cannot be used for a filter.

FIG. 1 is an explanatory view showing an appearance of a temperature gradient in a honeycomb structure. In FIG. 1, an end face of a honeycomb structure is shown on the upper side, and a graph showing a relation between positions on B-C line on the end face and temperature on the lower side. That is, the graph on the lower side of FIG. 1 shows a temperature gradient of a honeycomb structure, the curve 101 shows a relation between each end face position and temperature in this graph shown a temperature gradient (in a honeycomb segment bonded body) of a honeycomb structure having a conventional segment structure, and the curve 102 shows a temperature gradient (in a honeycomb segment bonded body) of a honeycomb structure of the present invention.

Since, in a conventional honeycomb structure, a material constituting the bonding material layer 9 has higher density and larger thermal capacity than a material constituting honeycomb segments 2, temperature of the bonding material layer 9 hardly rises upon regeneration (or upon use). In particular, temperature most hardly rises in a bonding cross portion 9a, where the bonding material layers 9 cross. This is because the proportion of the bonding material layer 9 (proportion per certain volume or certain cross-sectional area) is high in the bonding cross portion 9a and because the bonding cross portion 9a corresponds with the portion having the farthermost distance from the center of the honeycomb segments 2. When temperature hardly rises, temperature upon regeneration in a honeycomb segment 2 near the bonding cross portion 9a, i.e., in a corner portion of a honeycomb segment 2 becomes lower than in the central portion of the honeycomb segment 2, and a temperature gradient in the whole honeycomb segment bonded body 10 becomes larger to give the temperature gradient as shown by the curve 101 (full line). Generation of such a temperature gradient sometimes causes a crack in the honeycomb segment bonded body 10.

On the other hand, since a honeycomb structure of the present invention preferably has more pores in the bonding cross portion 9a (has a higher porosity) and smaller thermal capacity in the portion, temperature in a corner portion of the honeycomb segments 2 easily rises, and a temperature gradient in the whole honeycomb segment bonded body 10 becomes smaller to give the temperature gradient as shown by the curve 102 (broken line). Therefore, defects such as a crack due to thermal stress are effectively inhibited from being generated upon use and upon regeneration.

Next, with the honeycomb structures 40, 50 shown in FIGS. 4 to 7 being intended, a method used for a honeycomb structure of the present invention and a manufacturing method will be described. As the material for the honeycomb segment 2, it is preferable to use at least one kind selected from the group consisting of silicon carbide, silicon-silicon carbide based composite material, silicon nitride, cordierite, mullite, alumina, spinel, silicon carbide-cordierite based composite material, silicon-silicon carbide composite material, lithium aluminum silicate, aluminum titanate, and Fe—Cr—Al based metal from the viewpoint of strength and thermal resistance. Of these, silicon carbide or silicon-silicon carbide based composite material is preferable.

The honeycomb segment 2 can be manufactured by, for example, adding to a material suitably selected from the above materials a binder such as methyl cellulose, hydroxypropoxyl cellulose, hydroxyethyl cellulose, carboxymethyl cellulose, and polyvinyl alcohol, a surfactant, and water as a solvent to obtain clay having plasticity, subjecting the clay to extrusion forming to obtain a shape described above, drying with microwaves, hot air, or the like, and sintering.

As a filler 7 used for plugging the cells 5, the same material as for the honeycomb segment 2 may be used. Plugging with the filler 7 is conducted by immersing an end face of a honeycomb segment 2 with cells 5 to be unplugged being masked in a slurried filler 5 to fill the filler into open cells 5. Though the filler 7 may be filled before firing or after firing after formation of the honeycomb segment 2, plugging is preferably conducted before firing because it requires only one firing step.

After manufacturing the honeycomb segments 2, a pasty cement material (bonding material) which becomes the bonding material layer 9 is applied on the outer peripheral surfaces of the honeycomb segments 2 to combine the honeycomb segments 2 to obtain a predetermined solid shape (whole structures of honeycomb structures 40, 50). Since the bonding material layer 9 is a layer functioning to bond the honeycomb segments 2, the cement material may be applied to the outer peripheral faces of each of the adjacent honeycomb segments 2. However, it may be applied on only one outer peripheral face of the corresponding faces of adjacent honeycomb segments 2.

The thickness of the bonding material layer 9 is determined in consideration of bonding force between honeycomb segments 2 and suitably selected, for example, within the range from 0.2 to 4.0 mm. In addition, it is preferable that the bonding material layer 9 has a thermal conductivity of 0.1 to 5.0 W/m·k and has a thermal expansion coefficient of $1 \times 10^{-6}$ to $8 \times 10^{-6}/°$ C., which is relatively low, in order to inhibit a crack from generating due to thermal shock or the like.

As a cement material for the bonding material layer 9, there is suitably employed a material constituted of inorganic fibers, an inorganic binder, an organic binder, inorganic particles, and hollow resin particles. Specifically, examples of the inorganic fibers include oxide fibers of aluminosilicate, alumina, and the like, and other fibers (e.g., SiC fibers). Examples of the inorganic binder include silica sol, alumina sol, and clay. Examples of the organic binder include polyvinyl alcohol (PVA), carboxymethyl cellulose (CMC), and methyl cellulose (MC). Examples of the inorganic particles include ceramics such as silicon carbide, silicon nitride, cordierite, alumina, and mullite.

After the honeycomb segments 2 are joined, they are compression-bonded from four directions in the joined state, followed by heat-drying for evaporating water from the cement material to obtain a honeycomb segment bonded body 10 where a plurality of honeycomb segments 2 are unitarily bonded. Then, the honeycomb segment bonded body 10 is ground to have the aforementioned shape, and the outer peripheral face is covered with a coating material which becomes an outer peripheral coat layer 4, followed by heat-drying. Thus, honeycomb structures 40, 50 shown in FIGS. 4 to 7 are manufactured.

Incidentally, the outer peripheral coat layer 4 is applied on the outer peripheral surface of the bonded body of the honeycomb segments 2 and functions to protect the outer peripheral surface of the bonded body of the honeycomb segments 2, and the thickness of the outer peripheral coat layer 4 is suitably selected within the range from 0.1 to 1.5 mm. In addition, according to the bonding material layer 9, the outer peripheral coat layer 4 preferably has a thermal conductivity of 0.1 to 5.0 W/m·k and a thermal expansion coefficient of $1 \times 10^{-6}$ to $8 \times 10^{-6}/°$ C., which is relatively low, in order to inhibit a crack from generating due to thermal shock or the like.

As a means for adjusting porosity in the bonding cross portion 9a and the bonding portion other than the bonding cross portion 9b in the bonding material layer 9, there is a method where a content of hollow resin particles in the bonding material (cement material) is adjusted in the first place. For example, a content of hollow resin particles contained in the bonding material which becomes a bonding cross portion 9a (bonding material for a bonding cross portion) is made higher than that of the bonding material which becomes the bonding portion other than the bonding cross portion 9b (bonding material for the bonding portion other than the bonding cross portion), and the bonding material for a bonding cross portion is injected by an injector into a portion which becomes a bonding cross portion later when the honeycomb segments 2 are combined, and thereby the porosity in the bonding cross portion 9a can be made higher than those in bonding portions other than the bonding cross portion 9b.

In addition, by embedding stick-shaped wax in a portion which becomes a bonding cross portion later when a plurality of honeycomb segments 2 are combined, the porosity in the bonding cross portion 9a can be made higher than those of bonding portions other than the bonding cross portion 9b.

Further, by optimizing a water content of the cement material, a heat curve (temperature-rise rate, etc.), and time for being left to stand after combining, the porosity of the bonding cross portion 9a and the bonding portion other than the bonding cross portion 9b and thermal capacity can be adjusted. This is because, by adjusting and optimizing the three parameters when heat-drying is conducted in order to extract water from the cement material after the honeycomb segments 2 are joined compression-bonded from four directions, water transfer can be controlled.

Specifically, it is as follows. Upon heat-drying, water contained in the cement material evaporates and is absorbed by the honeycomb segments, which has higher porosity and water absorbability than the cement material. Therefore, a pore 8 is formed in the bonding material layer 9. Since the honeycomb segments 2 are not present directly around a bonding cross portion 9a (see FIG. 5), water transfer is hardly caused in comparison with the bonding portion other than the bonding cross portion 9b. However, if it is left to stand for a long period of time, water is absorbed by the honeycomb segments 2 and starts to transfer from the bonding cross portion 9a to the bonding portion other than the bonding cross portion 9b, where the water amount is reduced, and water also in the bonding cross portion 9a decreases. From such a mechanism of water transfer, by adjusting and optimizing the above three parameters, for example, by evaporating water before water transfers from the bonding cross portion 9a to the bonding portion other than the bonding cross portion 9b, the porosity in the bonding cross portion 9a can be made higher than those of bonding portions other than the bonding cross portion 9b. What matters is not transfer of water in the bonding portion other than the bonding cross portion 9b but the relative difference (proportion) in porosity between the bonding cross portion 9a and the bonding portion other than the bonding cross portion 9b. That is, a pore S maybe formed in the bonding portion other than the bonding cross portion 9b by drying (evaporating water) the bonding portion other than the bonding cross portion 9b before water transfers to the honeycomb segments 2, or it is possible to hardly form a pore 8 in the bonding portion other than the bonding cross portion 9b by transferring only water in the bonding portion other than the bonding cross portion 9b to the honeycomb segments 2.

EXAMPLES

Hereinbelow, the present invention will be described more specifically with referring to Examples. However, the present invention is by no means limited by the Examples. For example, in a honeycomb structure of the present invention, the bonding cross portion has smaller thermal capacity than those of bonding portions other than the bonding cross portion, and a means for obtaining such a honeycomb structure is not limited to the contents of the following Examples.

Example 1

[Manufacture of Honeycomb Segment]

As honeycomb segment raw materials, a SiC powder and a metal Si power are mixed together at a mass ratio of 80:20. To the mixture were added starch, and hollow resin particles as a pore former, and further added methyl cellulose, hydroxypropoxylmethyl cellulose, a surfactant, and water to obtain clay having plasticity. The clay was subjected to extrusion-forming and drying with microwaves and hot air to obtain a honeycomb segment formed body. The honeycomb segment formed body has a partition wall thickness of 310 μm, a cell density of about 46.5 cells/cm$^2$ (300 cells/inch$^2$), a square shape having a side length of 35 mm, and a length of 152 mm. Next, using the same material as that for the honeycomb segment raw material as the plugging material, both the end faces of the honeycomb segment formed body were plugged in such a manner that each end face shows a checkerwise pattern, that is, that adjacent cells are plugged in mutually opposite end portions. After drying, the honeycomb formed body was degreased at about 400° C. in the ambient atmosphere and further fired at about 1450° C. in Ar inert atmosphere to manufacture a honeycomb segment having a porous structure, where SiC crystalline particles were bonded with Si.

[Preparation of Bonding Material]

To a mixture of alumino silicate fibers as inorganic fibers, colloidal silica and clay as inorganic binders, and SiC as inorganic particles was added water and were further added a hollow resin particles, and a dispersant, followed by kneading for 30 minutes with a mixer to obtain a pasty bonding material for the bonding portion other than the bonding cross portion and bonding material for the bonding cross portion. The difference between the bonding material for the bonding portion other than the bonding cross portion and the bonding material for the bonding cross portion is that the bonding material for the bonding cross portion has a higher content of the hollow resin particles than the bonding material for the bonding portion other than the bonding cross portion. In Example 1, the amount of the hollow resin particles for the bonding material for the bonding cross portion was increased by 0.7% by mass with respect to that for the bonding material for the bonding portion other than the bonding cross portion. The amount of 0.7% by mass means an increased amount of the hollow resin particles, and, when the amount of the hollow resin particles added to the bonding material for the bonding cross portion is defined as 1, the amount of the hollow resin particles added to the bonding material for the bonding portion other than the bonding cross portion is 1.007 by a mass ratio.

[Manufacture of DPF(Honeycomb Structure)]

The bonding material for the bonding portion other than the bonding cross portion was coated on an outer wall face of a honeycomb segment so that the bonding material might have a thickness of about 1 mm to form a bonding material layer constituting the bonding portion other than the bonding cross portion. Then, another honeycomb segment was disposed on the face where the bonding material was applied, and a step of applying the bonding material to the portion to become a bonding cross portion later by injection was repeated to manufacture a honeycomb segment laminated body constituted of a plurality of honeycomb segments. After pressure was applied from outside to the laminated body to bond the whole, the laminated body was dried at 140° C. for two hours to obtain a honeycomb segment bonded body. Then, the outer periphery of the honeycomb segment bonded body was cut to have a cylindrical shape, and a coating material was applied to form an outer coat layer, followed by hardening by drying at 700° C. for two hours to manufacture a DPF (honeycomb structure) having a diameter of 144 mm and a length of 152 mm.

Examples 2 to 8, Comparative Example 1

A honeycomb structure was manufactured in the same manner as in Example 1 except for changing the increased amount of the hollow resin particles for the bonding material for the bonding cross portion with respect to the bonding material for the bonding portion other than the bonding cross portion. Increased amounts of the hollow resin particles were 3.8 mass % in Example 2, 5.4 mass % in Example 3, 11.0 mass % in Example 4, 14.3 mass % in Example 5, 27.6 mass % in Example 6, 41.4 mass % in Example 7, and 61.6 mass % in Example 8. In Comparative Example 1, the increased amount was 0 mass % (not increased), and the bonding material for the bonding cross portion having the same blending ratio as the bonding material for the bonding portion other than the bonding cross portion was injected into the portion functioning as the bonding cross portion.

In the first place, a soot regeneration test was conducted as follows using the DPF (honeycomb structure) obtained above. Post injection was turned on under the conditions of a soot amount of 8 g/L (soot accumulation of 8 g per liter), an engine rotation frequency of 2000 rpm, and an engine torque of 50 Nm and turned off when pressure loss in front and at the back of the DPF started decreasing to shift the engine state to the idle state. Since switching to the idle state in a state where soot accumulating in the DPF is combusted raises an oxygen concentration and decreases the amount of exhaust gas flowing therein, the temperature inside the DPF rose steeply.

Figure 8:
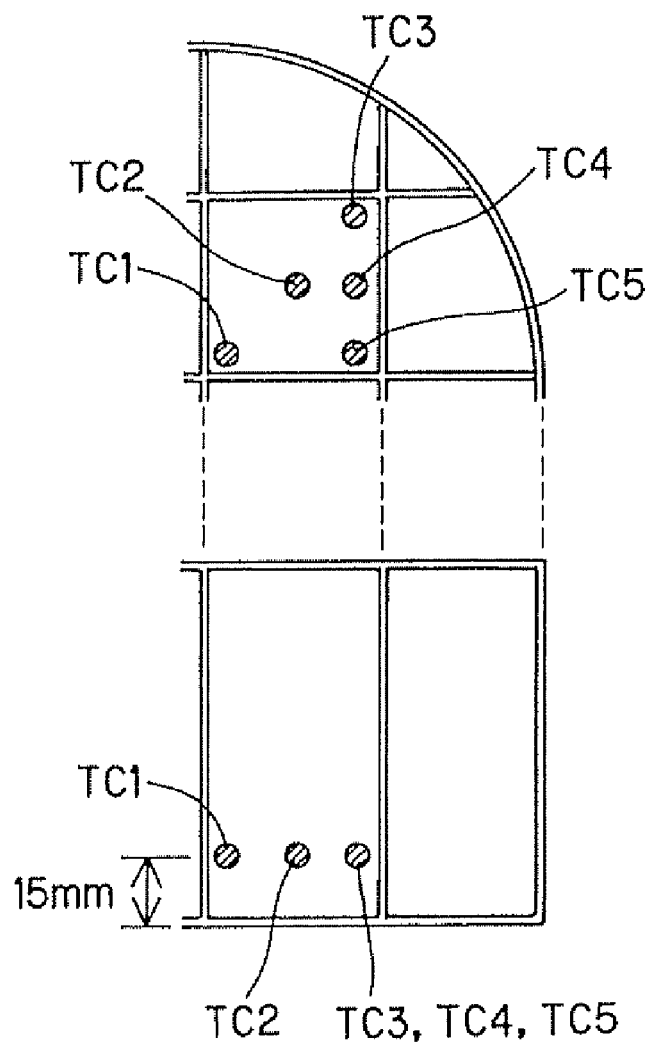
FIG. 8 is a view showing disposition locations of thermocouples in Examples.

In addition, as shown in FIG. 8, in a honeycomb segment constituting the center, five thermocouples in total were inserted into the positions of TC1, TC2, TC3, TC4, and TC5 to measure the highest temperature upon regeneration. The results are shown in Table 1. In addition, temperature gradient was obtained by dividing the difference in temperature of adjacent thermocouples by the distance. Incidentally, in FIG. 8, the top drawing shows a cross section perpendicular to a direction of the central axis of a columnar DPF (honeycomb structure), and the bottom drawing shows a cross section in parallel with a direction of the central axis. In the bottom drawing, the downward direction faces the downstream side.

those of bonding portions other than the bonding cross portion. In particular, it could be confirmed that the maximum temperature gradient was reduced to 0.89 time by the porosity ratio of 10.0 and thermal capacity ratio of 10% (0.1) as shown in Example 8.

INDUSTRIAL APPLICABILITY

A honeycomb structure of the present invention is useful as a trapping filter for exhaust gas, for example, a diesel particu-

TABLE 1

| Item<br>Unit | Voidage of bonding cross position<br>% | Thermal capacity ratio<br>% | Voidage ratio<br>— | Temperature measurement position (Thermocouple disposition site) | | | | | Maximum temperature gradient<br>° C./cm | Maximum temperature gradient ratio<br>— |
| --- | --- | --- | --- | --- | --- | --- | --- | --- | --- | --- |
| | | | | TC1<br>° C. | TC2<br>° C. | TC3<br>° C. | TC4<br>° C. | TC5<br>° C. | | |
| Comp. Ex. 1 | 10 | 100 | 1.0 | 969 | 985 | 597 | 667 | 689 | 187 | (1.0) |
| Example 1 | 11 | 100 | 1.1 | 970 | 986 | 600 | 668 | 689 | 186 | 0.99 |
| Example 2 | 15 | 90 | 1.5 | 973 | 989 | 612 | 670 | 691 | 182 | 0.97 |
| Example 3 | 18 | 90 | 1.8 | 967 | 983 | 612 | 666 | 687 | 179 | 0.96 |
| Example 4 | 25 | 80 | 2.5 | 966 | 982 | 617 | 665 | 687 | 176 | 0.94 |
| Example 5 | 30 | 80 | 3.0 | 968 | 984 | 615 | 667 | 688 | 178 | 0.95 |
| Example 6 | 50 | 60 | 5.0 | 973 | 989 | 624 | 670 | 691 | 176 | 0.94 |
| Example 7 | 70 | 30 | 7.0 | 962 | 978 | 619 | 663 | 684 | 173 | 0.93 |
| Example 8 | 95 | 10 | 10.0 | 964 | 980 | 634 | 664 | 685 | 167 | 0.89 |

After the soot regeneration test was completed, the used DPF (honeycomb structure) was cut at 10 cross-sections perpendicular to a direction of the central axis at regular intervals, and bonding cross portions present in the cross sections were observed by a SEM (electron microscope). In addition, the images of the SEM were subjected to image analysis, and porosity of each of the ten cross sections of the bonding cross portion and the bonding portion other than the bonding cross portion was obtained. The porosity in the bonding portion other than the bonding cross portion other than the bonding cross portion was 10%. Further, thermal capacity per unit volume was obtained by using the formula, (1-porosity)×bonding material density×specific heat, on the basis of the average value of the porosity in ten cross sections. Next, a porosity ratio (=porosity of bonding cross portion/porosity of other bonding portion) and a thermal capacity ratio (=thermal capacity of bonding cross portion/thermal capacity of another bonding portion) were obtained. The highest temperature in the DPF was recognized in TC2 in any of the cases of Examples 1 to 8 and Comparative Example 1, and temperature of each of the other thermocouples (TC1, TC3 to TC5) was confirmed at the timing of the highest temperature in TC2 to find out that TC3 has the lowest temperature in any of Examples 1 to 8 and Comparative Example 1. Therefore, the maximum temperature gradient was obtained from the formula, (TC2 temperature−TC3 temperature)/(distance between TC2 and TC3) The results are shown in Table 1. Incidentally, Table 1 shows the ratio of the maximum temperature gradient of each of Examples 1 to 8 when the maximum temperature gradient of Comparative Example 1 was defined as 1.0.

(Discussion)

Form the results shown in Table 1, it was found that temperature gradient can be reduced by making the porosity of the bonding cross portion higher than those of bonding portions other than the bonding cross portion and by making the thermal capacity of the bonding cross portion smaller than late filter (DPF) for trapping and removing particulate matter contained in exhaust gas from a diesel engine, etc.

The invention claimed is:

1. A honeycomb structure comprising:
a honeycomb segment bonded body obtained by unitarily bonding a plurality of honeycomb segments at bonded faces via a bonding material layer, the bonding material layer having a bonding cross portion where two or more bonding material layers of the bonding material layers cross, and an outer periphery coat layer coating an outer peripheral face of the honeycomb segment bonded body and having a structure having a plurality of cells functioning as fluid passages disposed in parallel with one another in a direction of a central axis,
wherein the bonding material layer of each bonding cross portion has a smaller thermal capacity than those of bonding material layers other than the bonding cross portion of the bonding material layers.

2. A honeycomb structure according to claim 1, wherein the bonding cross portion has a thermal capacity of 5% or more and 95% or less with respect to 100% of thermal capacities of bonding material layers other than the bonding cross portion.

3. A honeycomb structure according to claim 1, wherein the bonding cross portion has a higher porosity than those of bonding material layers other than the bonding cross portion.

4. A honeycomb structure according to claim 3, wherein the bonding cross portion has a porosity 1.1 to 15 times larger than those of bonding material layers other than the bonding cross portion.

5. A honeycomb structure according to claim 1, wherein the bonding material layer is constituted of inorganic fibers, an inorganic binder, an organic binder, and inorganic particles.

6. A honeycomb structure according to claim 1, wherein the honeycomb segment is constituted of silicon carbide or a silicon-silicon carbide based composite material formed with employing silicon carbide as a framework and silicon as a bonding material.

7. A honeycomb structure according to claim 2, wherein the bonding cross portion has a higher porosity than those of bonding material layers other than the bonding cross portion.

8. A honeycomb structure according to claim 7, wherein the bonding cross portion has a porosity 1.1 to 15 times larger than those of bonding material layers other than the bonding cross portion.

9. A honeycomb structure according to claim 1, the plurality of honeycomb segments each include corners along the direction parallel to the fluid passages,
wherein each bonding cross portion is disposed at least one of the corners,
the bonding material layers other than the bonding cross portion of the bonding material layers are disposed outside of the at least one of the corners.

\* \* \* \* \*